(12) United States Patent
Chiang (10) Patent No.: US 8,212,779 B2
(45) Date of Patent: Jul. 3, 2012

(54) DIGITAL AUDIO/VIDEO PLAYING DEVICE

(75) Inventor: Cheng-Hung Chiang, Hsinchu (TW)

(73) Assignee: Getac Technology Corporation, Hsinchu (TW)

( * ) Notice: Subject to any disclaimer, the term of this patent is extended or adjusted under 35 U.S.C. 154(b) by 530 days.

(21) Appl. No.: 12/481,534

(22) Filed: Jun. 9, 2009

(65) Prior Publication Data
US 2010/0049345 A1  Feb. 25, 2010

Related U.S. Application Data

(63) Continuation-in-part of application No. 11/097,327, filed on Apr. 2, 2005, now abandoned.

(30) Foreign Application Priority Data

Dec. 13, 2004  (TW) .............................. 93138652 A (51) Int. Cl.
*G06F 17/00* (2006.01)

(52) U.S. Cl. ....... 345/169; 345/156; 345/173; D14/496; D14/507; D14/203

(58) Field of Classification Search .................. 345/156, 345/169, 173; D14/496, 507, 203
See application file for complete search history.

(56) References Cited

U.S. PATENT DOCUMENTS

| | | | | |
|---|---|---|---|---|
| D469,109 S * | 1/2003 | Jobs et al. ................. D14/203.7 |
| D472,245 S * | 3/2003 | Andre et al. ................. D14/496 |
| 7,046,230 B2 * | 5/2006 | Zadesky et al. ............... 345/156 |
| 7,081,883 B2 * | 7/2006 | Chen ................. 345/163 |
| 7,333,092 B2 * | 2/2008 | Zadesky et al. ............... 345/169 |
| 7,348,967 B2 * | 3/2008 | Zadesky et al. ................ 345/173 |
| D566,725 S * | 4/2008 | Kaneko et al. ............... D14/496 |
| D572,268 S * | 7/2008 | Niizawa et al. ............... D14/496 |
| D578,137 S * | 10/2008 | Sheba et al. ................. D14/496 |
| D584,742 S * | 1/2009 | Sheba et al. ................. D14/496 |
| D593,535 S * | 6/2009 | Sheba et al. ............. D14/203.7 |
| D610,126 S * | 2/2010 | Andre et al. ............. D14/203.7 |
| 7,683,918 B2 * | 3/2010 | Bohan et al. ................. 345/684 |
| 7,903,002 B2 * | 3/2011 | Olsson et al. .................... 341/22 |
| 2003/0076306 A1 * | 4/2003 | Zadesky et al. ................ 345/173 |
| 2003/0122792 A1 * | 7/2003 | Yamamoto et al. ........... 345/173 |
| 2005/0076306 A1 * | 4/2005 | Martin et al. .................. 715/747 |
| 2005/0174332 A1 * | 8/2005 | Hunag et al. .................. 345/168 |
| 2006/0250377 A1 * | 11/2006 | Zadesky et al. ................ 345/173 |
| 2007/0013671 A1 * | 1/2007 | Zadesky et al. ................ 345/173 |
| 2007/0052691 A1 * | 3/2007 | Zadesky et al. ................ 345/173 |
| 2007/0080936 A1 * | 4/2007 | Tsuk et al. ..................... 345/156 |
| 2007/0080938 A1 * | 4/2007 | Robbin et al. ................. 345/157 |
| 2007/0083822 A1 * | 4/2007 | Robbin et al. ................. 715/786 |
| 2007/0268258 A1 * | 11/2007 | Chen et al. .................... 345/169 |
| 2008/0001773 A1 * | 1/2008 | Rye et al. ................. 340/825.22 |

* cited by examiner

*Primary Examiner* — Bipin Shalwala
*Assistant Examiner* — Afroza Chowdhury (57) ABSTRACT

A digital audio/video playing device includes a touch control board, a plurality of switch units disposed outside a perimeter of the touch control board, and a support plate disposed on the touch control board and switch units. The support plate includes a central portion, an intermediary portion ringing the central portion, and an outer portion ringing the intermediary portion. The central portion and the outer portion are thicker than the intermediary portion such that the intermediary portion is recessed relative to the central portion and the outer portion. The intermediary portion is disposed directly facing the touch control board. A plurality of depressible tabs are formed in the outer portion, each depressible tab corresponding to and directly facing a corresponding one of the switch units. A surface film is arranged over and covering the support plate such that a raised-recessed-raised configuration is formed.

14 Claims, 6 Drawing Sheets

DIGITAL AUDIO/VIDEO PLAYING DEVICE

CROSS REFERENCE TO RELATED APPLICATIONS

This is a continuation-in-part of application Ser. No. 11/097,327, filed Apr. 4, 2005, which is incorporated in its entirety herein by reference.

FIELD OF THE INVENTION

The present invention relates generally to a digital audio/video playing device, in particular to an operation panel structure of a digital audio/video playing device.

BACKGROUND OF THE INVENTION

With the development of computer technology and digitalized multi-medium technology, computer devices are widely used in a variety of applications, such as office applications, home entertainments, and business operations. Some of the latest developments successfully combine multi-medium or digital music features in portable computer devices, such as notebook computer and thus allowing general consumers to watch multi-medium films or to listen to digital music with the notebook computers.

However, due to the current trend and requirement from general consumers of miniaturization of the portable electronic devices, playing multi-medium film or digital music with the notebook computers is not the best choice for the consumers and portable multi-medium player and digital music players gradually take place of the notebook computers in playing digital music or multi-medium film. These market available digital playing device comprise a micro storage for storing digital music and multi-medium data that can be retrieved and played by the playing device whereby the general consumers can enjoy the film and music at any time and any place.

The evolution of the digital playing device, however, does not accompany any significant improvement in the operation and control panel, which means the new device is operated with the same old control panel. In the conventional control panel, a number of openings are defined in a casing of the playing device and keys or pushbuttons of the same number extend beyond the openings respectively and are thus accessible by and selectively depressible by the user to operate the playing device. Examples are illustrated in U.S. Designs D469109S and D472245S, in which a casing forms a plurality of openings arranged in a circular configuration each for the extension of a pushbutton to allow the depression by a user.

The conventional control or operation panel requires openings that are formed in advance and are of high precision of location in order to allow for snug extension of the pushbuttons. This does not raise any significant problem in manufacturing for electronic devices of regular sizes, such as household electric appliance or industry electric devices. However, for the miniaturized portable device, extremely severe requirement for high precision must be met in order to effect snug extension of tiny pushbuttons. As a consequence, any defeat in quality control regarding the mechanical dimension of the parts of the playing device will lead to failure of product.

In the previously mentioned US designs, the area surrounded by the pushbuttons is provided with a circular control disk. The disk has an outer rim, which is raised with respect to the casing with a gap existing therebetween. Such a structure forms an obstacle to a user's finger that slides along the surface of the casing for operating the pushbuttons. Such a problem also exists in a variety of portable electronic devices that are currently available in the market.

Even the gap and raised rim that are commonly seen in the operation panel or control panel of the conventional portable electronic devices are made hardly felt by the user, there is still a problem of humidity penetration into the device through the tiny gap to be overcome for the conventional designs. Humidity is one of the major causes that fail the electronic devices.

Thus, the present invention is aimed to solve the above-discussed problems.

SUMMARY OF THE INVENTION

An objective of the present invention is to provide a digital audio/video playing device, comprising a surface film covering a surface of the playing device, wherein the film comprises a smoothly-raised external ring section and a touch-control internal ring section serving as a touch control whereby a user may apply a depressing force through the surface film to actuate depressible areas of a support plate and operate a touch board.

Another objective of the present invention is to provide an operation panel of a digital audio/video playing device, which has a continuous raised-recessed configuration to provide the operation panel with a smooth tactile feeling of operation by the user.

A further objective of the present invention is to provide an operation panel for a digital audio/video playing device featuring excellent isolation by providing a surface film covering a surface of a casing of the playing device and shielding pushbuttons accommodated in the casing, which effect isolation between inside and outside the casing and thereby increasing service life thereof.

To achieve the above objectives, in accordance with the present invention, a digital audio/video playing device comprises a casing defining an interior space. A storage device for storing audio/video data, a display unit is arranged and a touch control board are arranged in the interior space. The touch control board has an input area for receiving touch input. A plurality of switch units are disposed outside a perimeter of the touch control board. A support plate is disposed on the touch control board and switch units. The support plate comprises a central portion, an intermediary portion ringing the central portion, and an outer portion ringing the intermediary portion. The central portion and the outer portion are thicker than the intermediary portion such that the intermediary portion is recessed relative to the central portion and the outer portion. The intermediary portion is disposed directly facing the input area of the touch control board. A plurality of depressible tabs are formed in the outer portion, each depressible tab corresponding to and directly facing a corresponding one of the switch units such that depression of the depressible tab triggers the corresponding switch unit. A surface film is arranged over and covering the support plate such that a raised-recessed-raised configuration is formed comprising a raised central region corresponding to the central portion of the support plate, a recessed intermediary region ringing the central region and corresponding to the intermediary portion of the support plate, and a raised outer region ringing the intermediary region and corresponding to the outer portion of the support plate. Touch input is entered to the touch control board through the intermediary region, and switch units are triggered through the outer region.

The present invention provides a digital audio/video playing device comprising both switch units resembling conventional pushbutton and a touch control board, both of which can be used to operate/control the playing device, realizing efficient and convenient operation of the playing device. The digital audio/video playing device of the present invention further comprises a surface film, which effects isolation of inside the playing device from the external surroundings, while allowing a user to selectively actuate the switch units and operate the touch control board. The surface film has a continuous raised-recessed configuration, defining a smoothly-raised external ring section and a touch-control internal ring section by which the user may apply a force to either depressible tabs of a support plate to selectively actuate the switch units or a touch control board for operation thereof. The smoothly-raised configuration of the surface film provides the user with a smooth tactile feeling of contact and operation. The surface film, which effects isolation of the inside of the playing device, effectively prevents foreign objects, such as dusts and humidity, from entering the inside of the playing device and thus protecting the playing device and extending service life of the playing device. Value of the playing device can also be enhanced.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENTS

With reference to the drawings and in particular to FIGS. 1-5, a preferred embodiment of the digital audio/video playing device constructed in accordance with the present invention, generally designated with reference numeral 100, comprises a casing 1, which defines an interior space accommodating a data storage 11 that stores digital audio/video data to be played by the playing device 100. An internal power source 12 is also arranged in the interior space of the casing 1 for powering the digital audio/video playing device 100. The internal power source 12 may comprise a primary battery, or a secondary or rechargeable battery, or alternatively or in combination, the internal power source is comprised of a power adaptor that is connectable to an external power source, such as a wall outlet, for powering the digital audio/video playing device 100.

The casing 1 preferably forms an opening corresponding in position to the internal power source 12, which is removably covered by a lid 13 for manual access or replacement of the battery 12. The casing 1 preferably has opposite front and rear surfaces (not labeled), connected by opposite side faces and top and bottom faces. A record button 14 is preferably formed on one side face of the casing 1 and a hold button 16 and a USB connector 17 are formed on the opposite side face. An earphone jack 15 is preferably defined in the top face of the casing 1. A control circuit board 18 on which a control circuit is formed is fixed in the interior space of the casing 1 and is in electrical connection with the battery 12, the record button 14, the earphone jack 15, the hold button 16, and the USB connector 17.

Figure 1:
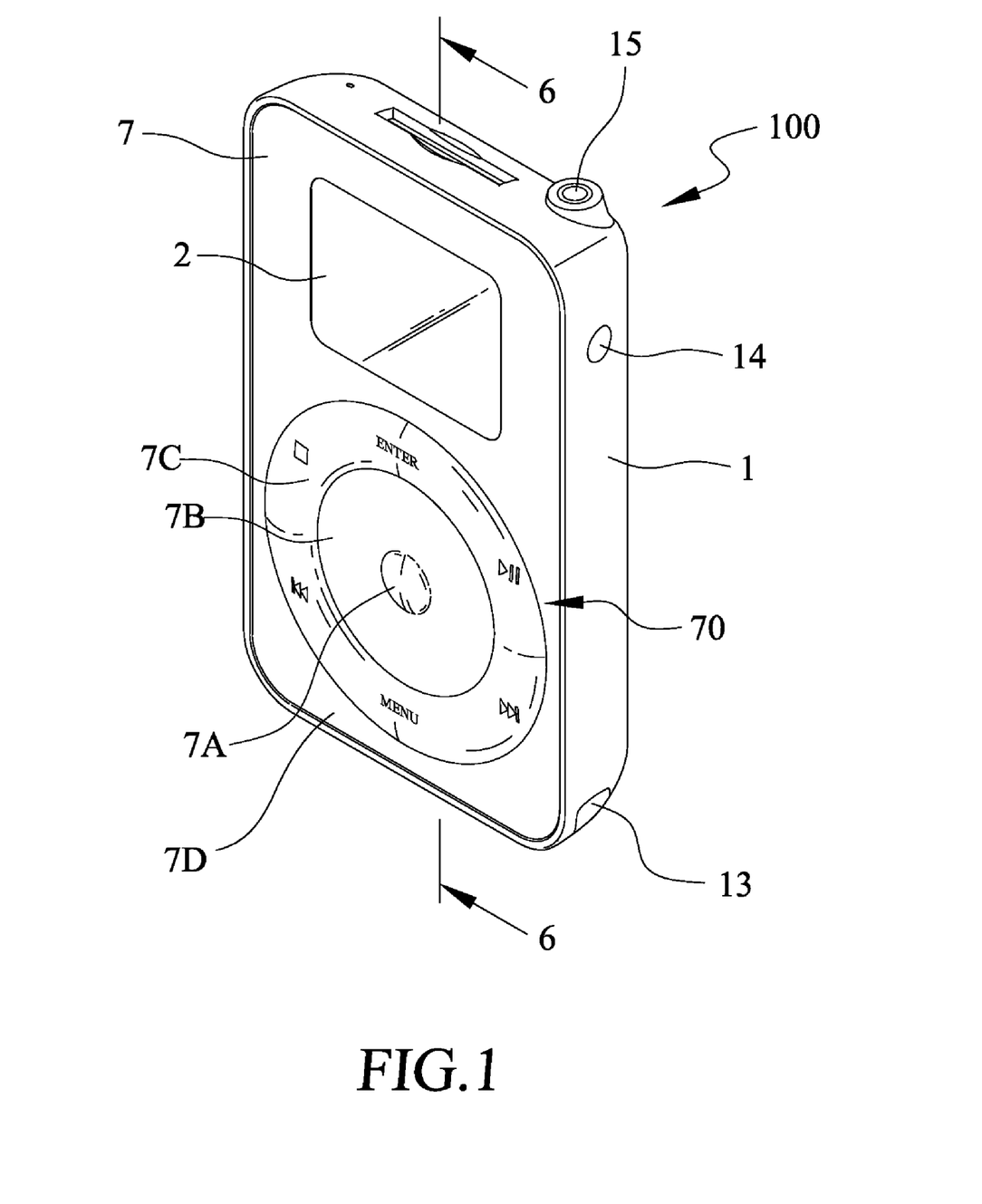
FIG. 1 is a perspective view showing a digital audio/video playing device constructed in accordance with the present invention.
Figure 2:
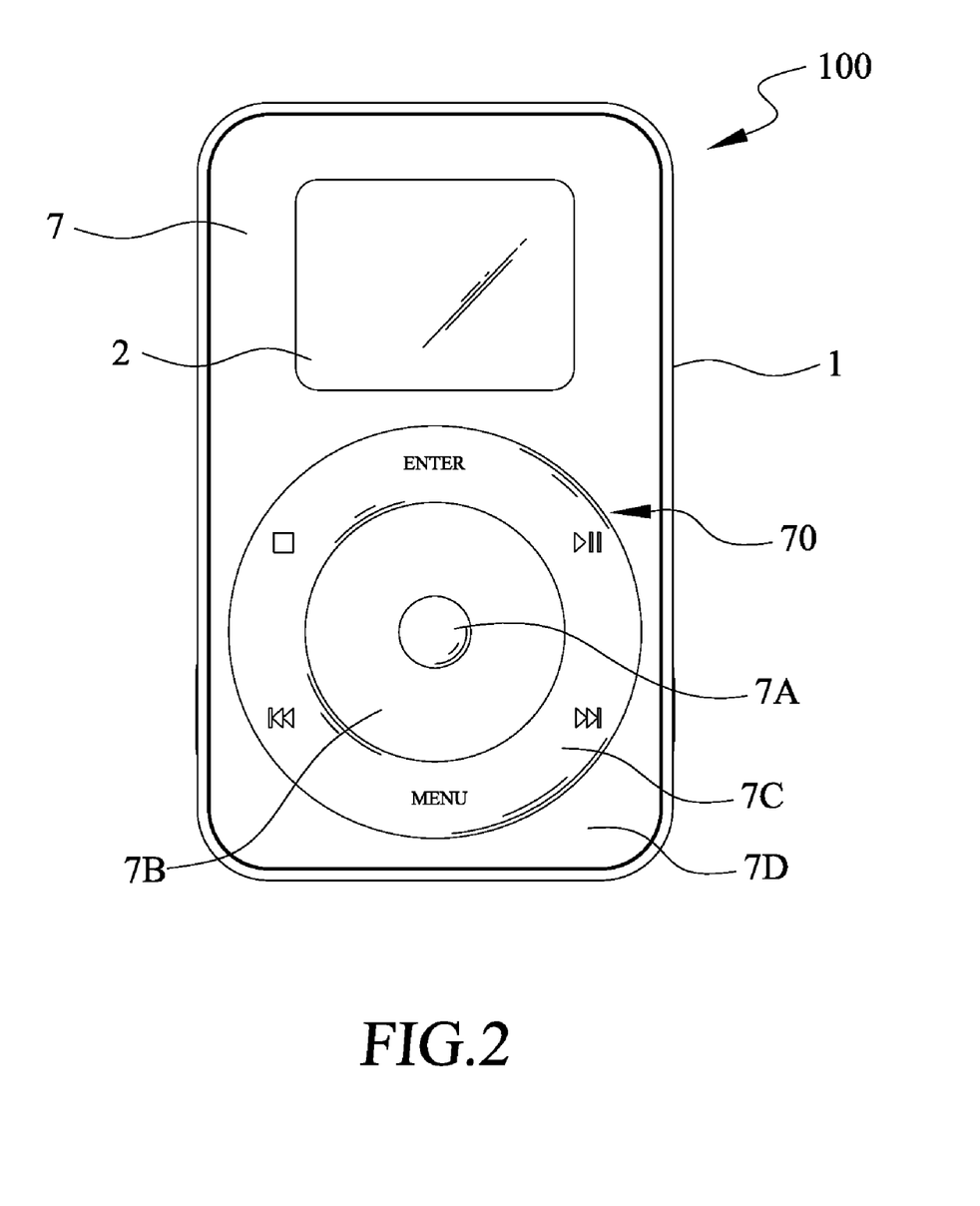
FIG. 2 is a front view of the digital audio/video playing device of the present invention.
Figure 3:
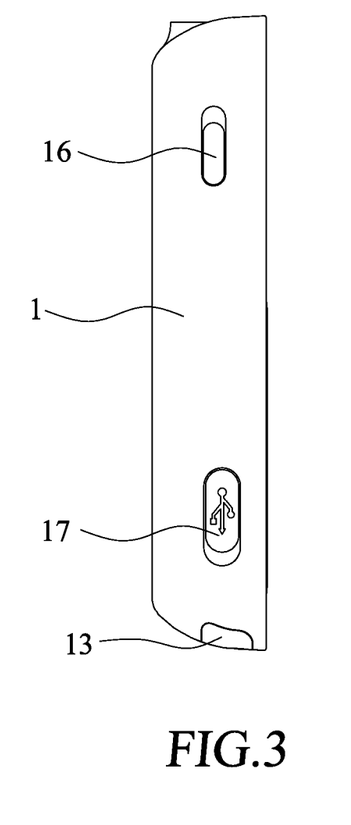
FIG. 3 is a side elevational view of the digital audio/video playing device of the present invention.
Figure 4:
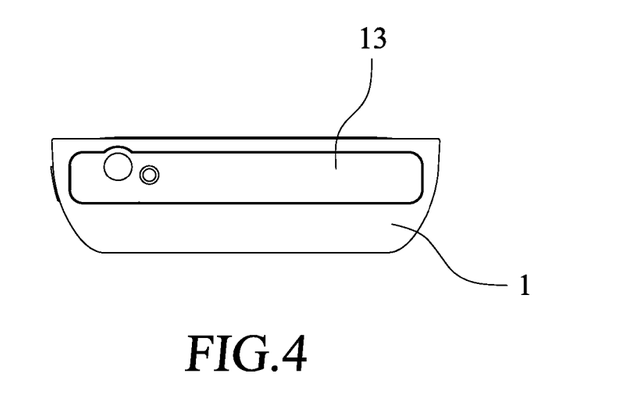
FIG. 4 is a bottom view of the digital audio/video playing device of the present invention.
Figure 5:
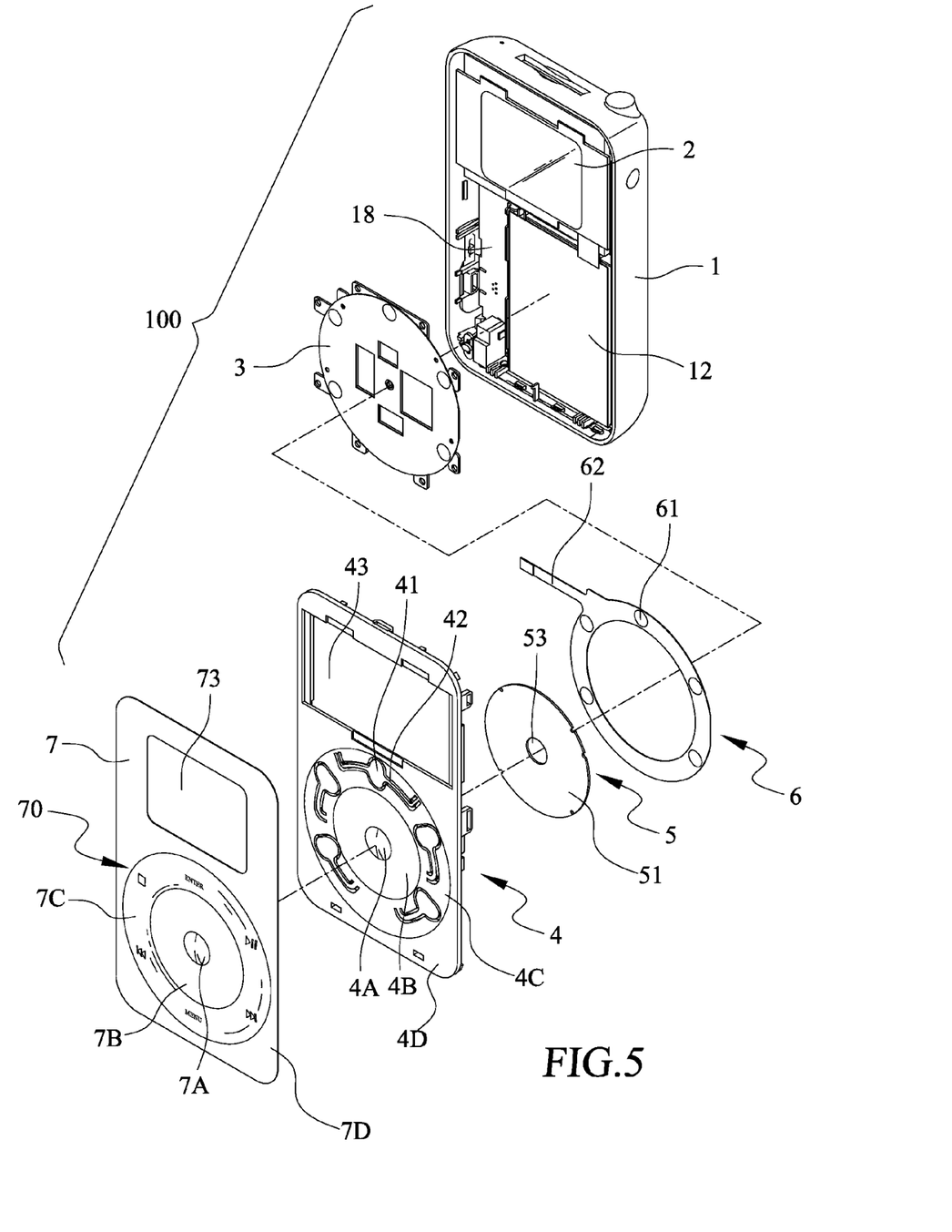
FIG. 5 is an exploded view of the digital audio/video playing device of the present invention.

In a preferred embodiment, a base plate 3 and a display unit 2 are also accommodated in the casing 1. The display unit 2 serves to display information/data related to the audio/video programs that are being played by the digital audio/video playing device 100, such as for example title of the programs, words of songs and the likes.

A touch control board 5 is disposed on the base plate 3. Touch control board 5 includes an input area 51 for receiving touch input and, in preferred embodiments, is circular and has a central through hole 53.

In the preferred embodiment, a switch set 6 comprising a plurality of switch units 61 is disposed outside a perimeter of the touch control board 5. The switch set 6 preferably comprises a cable 62, such as a flat cable, connected to the control circuit board 18 to transmit the signals generated by each switch unit 61 to the control circuit board 18. An example of the switches 61 includes thin film switches formed by conductive rubber.

Figure 6:
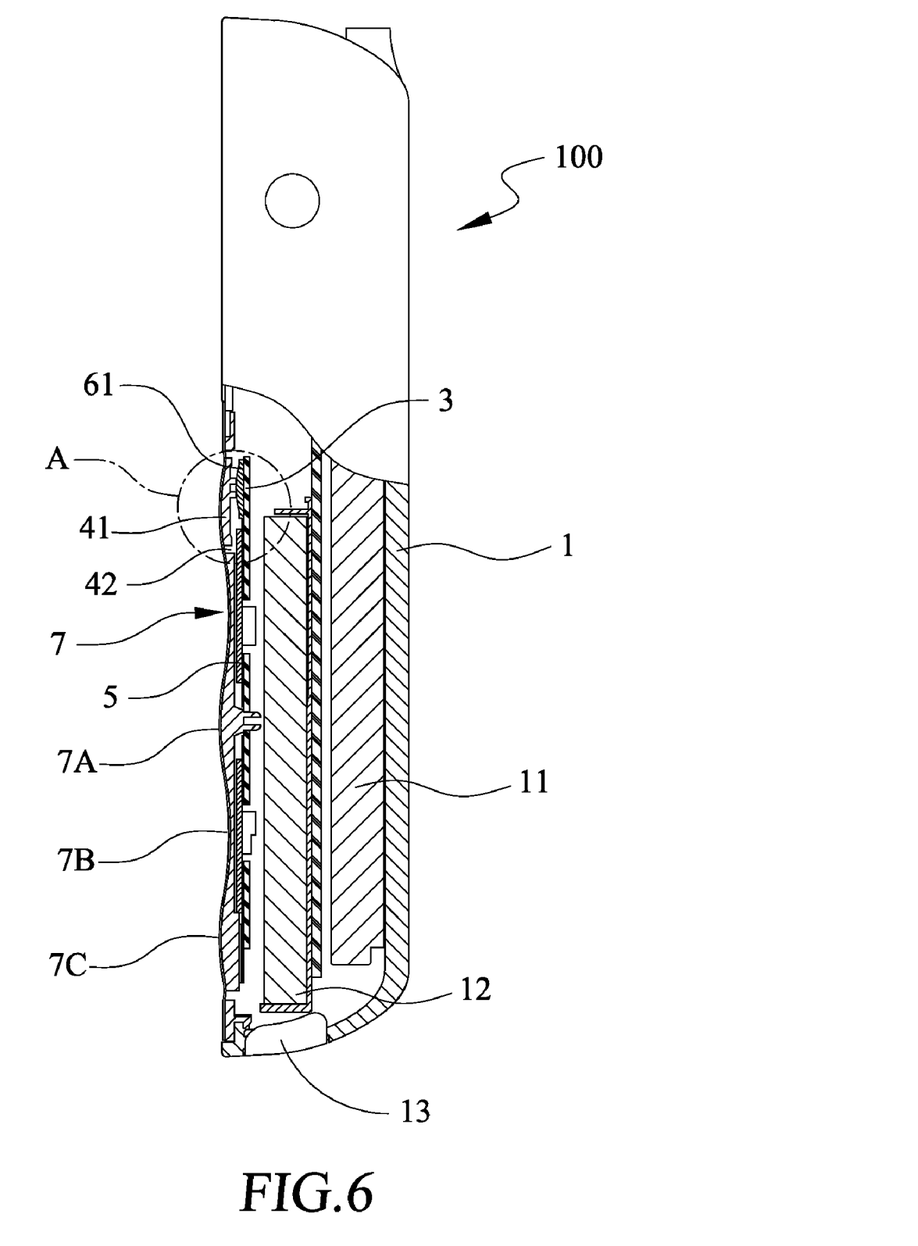
FIG. 6 is a side elevational view, partially sectioned, taken along line 6-6 of FIG. 1, showing inside details of the digital audio/video playing device.
Figure 7:
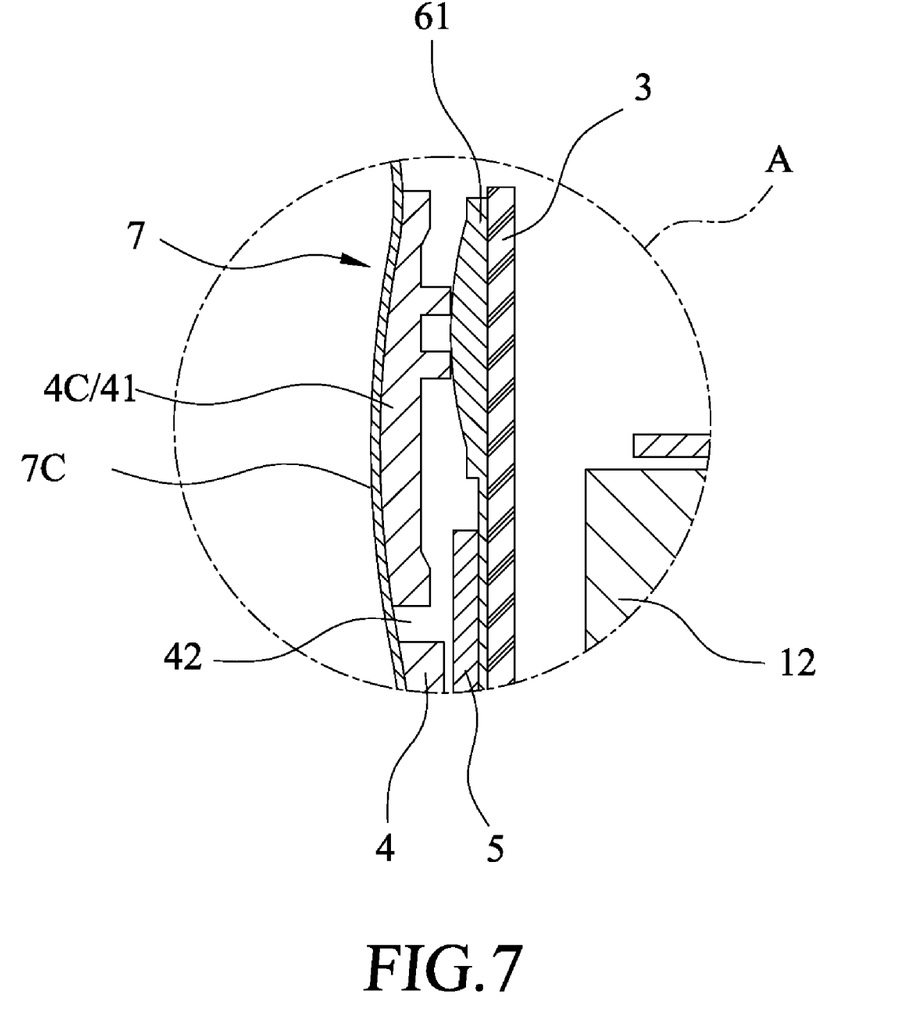
FIG. 7 is an enlarged view of encircled portion A of FIG. 6.

Also referring to FIGS. 6 and 7, a support plate 4 is preferably mounted to the base plate 3 and comprises a central portion 4A, an intermediary portion 4B ringing the central portion, and an outer portion 4C ringing the intermediary portion. The central portion 4A and the outer portion 4C are thicker than the intermediary portion 4B such that the intermediary portion 4B is recessed relative to the central portion 4A and the outer portion 4C. The intermediary portion 4B is disposed directly facing the input area 51 of touch control board 5. In a preferred embodiment, the central portion 4A, the intermediary portion 4B, and the outer portion 4C of the support plate 4 are circular and concentric, and furthermore the central, intermediary and outer portions are integrated together such that a continuous raised-recessed-raised configuration is formed in the support plate 4.

In a most preferred embodiment, a peripheral portion 4D surrounds the outer portion 4C and is recessed relative thereto. A window 43 may be formed in support plate 4 to correspond to display 2.

A plurality of depressible tabs 41 are preferably formed in the outer portion 4C, each depressible tab 41 corresponding to and directly facing a corresponding one of the switch units 61 such that depression of a depressible tab 41 triggers the corresponding switch unit 61. Namely, when the depressible tabs 41 are depressed, the corresponding switch units 61 are actuated to issue a corresponding signal. In a preferred embodiment each depressible tab 41 is formed by forming an elongate slit 42 in the support plate 42, which elongate slit 42 surrounds the tab 41 with a small connection with the support plate 4, which connection resiliently supports the slit-surrounded depressible tab 41, thereby allowing the area 41 to have a form similar to a cantilever beam that is resiliently deflectable when subject to an external force and to resume the original position thereof after the external force is removed.

A surface film 7 is attached to and covers the front surface of the casing 1. In particular, surface film 7 is preferably arranged over and covering the support plate 4 such that a raised-recessed-raised configuration is formed comprising a raised central region 7A corresponding to the central portion 4A of the support plate 4, a recessed intermediary region 7B ringing the central region 7A and corresponding to the intermediary portion 4B of the support plate 4, and a raised outer region 7C ringing the intermediary region 7B and corresponding to the outer portion 4C of the support plate 4. Preferably, the surface film 7 is molded into a raised-recessed-raised shape corresponding to the shape of the support plate 4.

In a preferred embodiment the surface film includes a peripheral region 7D covering the peripheral portion 4D of the support plate 4. A window 73 may be formed in peripheral region 7D corresponding to window 43 in support plate 4.

An operation zone 70 of the surface film 7 corresponds to both the touch control board 5 and the switching ring 6, which provides a variety of control function that a user may operate the digital audio/video playing device 100. In particular, the recessed intermediary region 7B corresponds to intermediary portion 4B of support plate 4, which in turn corresponds to input area 51 of touch control board 5. Thus, touch input may be entered to the touch control board 5 through the intermediary region 7B. Furthermore, raised outer region 7C corresponds to outer portion 4C of support plate 4 including depressible tabs 41, which in turn corresponds to the switch units 61 of the switch set 6. Thus, switch units 61 may be triggered through the outer region 7C.

Printings may be formed on the outer region 7C at positions corresponding to the depressible tabs 41 of the support plate 4 to allow the user to identify the positions, as well as functions, such as main menu, confirmation input, play/stop, forward, and backward, of the depressible tabs 41.

The central region 7A provides an aesthetic visual effect by forming the continuous raised-recessed configuration with the intermediary region 7B and outer region 7C, and also serves as a reference point for user's finger in operating the touch-control area of intermediary region 7B.

To operate the digital audio/video playing device 100 of the present invention, when the user depress the smoothly-raised outer region 7C of the surface film 7 at a position corresponding to a depressible tab 41 of the support plate 4, the depression force is transmitted through the surface film 7 to the switch set 6, whereby the corresponding switch unit 61 of the switch set 6 is actuated by the depressible tab 41 to generate a signal that is transmitted through the cable 62 to the control circuit board 18. When the user depresses the touch-control intermediary region 7B of the surface film 7, a force is applied to the touch control board 5 through the surface film 7 and intermediary portion 4B of the support plate 4 to effect operation of the touch control board 5 to realize selection of particular function.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A digital audio/video playing device, comprising:
   a casing defining an interior space;
   a storage device for storing audio/video data, the storage device arranged in the interior space;
   a display unit arranged in the interior space;
   a touch control board arranged in the interior space and having an input area for receiving touch input;
   a plurality of switch units disposed outside a perimeter of the touch control board;
   a support plate disposed on the touch control board and switch units, the support plate comprising a central portion, an intermediary portion ringing the central portion, and an outer portion ringing the intermediary portion, wherein the central portion and the outer portion are thicker than the intermediary portion such that the intermediary portion is recessed relative to the central portion and the outer portion, and wherein the intermediary portion is disposed directly facing the input area of the touch control board, and wherein a plurality of depressible tabs are formed in the outer portion, each depressible tab corresponding to and directly facing a corresponding one of the switch units such that depression of the depressible tab triggers the corresponding switch unit; and
   a surface film arranged over and covering the support plate such that a raised-recessed-raised configuration is formed comprising a raised central region corresponding to the central portion of the support plate, a recessed intermediary region ringing the central raised region and corresponding to the intermediary portion of the support plate, and a raised outer region ringing the intermediary region and corresponding to the outer portion of the support plate, wherein touch input is entered to the touch control board through the intermediary region, and switch units are triggered through the outer region.

2. The digital audio/video playing device as claimed in claim 1, further comprising a base plate, wherein the touch control board and switch units are disposed on the base plate.

3. The digital audio/video playing device as claimed in claim 1, wherein each depressible tab is defined in the support plate by forming an elongate slit leaving a small connection to support plate, thereby forming a cantilever tab that is elastically deformable.

4. The digital audio/video playing device as claimed in claim 1, wherein the switch unit comprises a thin film switch made of conductive rubber.

5. The digital audio/video playing device as claimed in claim 1, wherein the raised-recessed-raise configuration is smooth and continuous.

6. The digital audio/video playing device as claimed in claim 1, wherein the touch control board is circular.

7. The digital audio/video playing device as claimed in claim 6, wherein the touch control board is donut shaped, with a central area cut out corresponding to the central portion of the support plate.

8. The digital audio/video playing device as claimed in claim 1, wherein the central portion, the intermediary portion, and the outer portion of the support plate are circular and concentric.

9. The digital audio/video playing device as claimed in claim 1, wherein the support plate includes a peripheral portion surrounding the outer portion.

10. The digital audio/video playing device as claimed in claim 9, wherein the surface film includes a peripheral region covering the peripheral portion of the support plate.

11. The digital audio/video playing device as claimed in claim 9, wherein the surface film continuously covers the central portion, intermediary portion, outer portion and peripheral portion of the support plate.

12. The digital audio/video playing device as claimed in claim 9, wherein the peripheral portion comprises a window corresponding to the display unit.

13. The digital audio/video playing device as claimed in claim 12, wherein the surface film includes a peripheral region covering the peripheral portion of the support plate, the peripheral region comprising a cut out corresponding to the window.

14. The digital audio/video playing device as claimed in claim 1, wherein the surface film is molded into a raised-recessed-raised shape corresponding to the support plate.

* * * * *

UNITED STATES PATENT AND TRADEMARK OFFICE
CERTIFICATE OF CORRECTION

| | | |
|---|---|---|
| PATENT NO. | : 8,212,779 B2 | Page 1 of 1 |
| APPLICATION NO. | : 12/481534 | |
| DATED | : July 3, 2012 | |
| INVENTOR(S) | : Cheng-Hung Chiang | |

It is certified that error appears in the above-identified patent and that said Letters Patent is hereby corrected as shown below:

Title page, item 63 should read

Related U.S. Application Data

Continuation-in-part of application No. 11/097,327, filed on April 4, 2005, now abandoned.

Signed and Sealed this
Eleventh Day of September, 2012

David J. Kappos
*Director of the United States Patent and Trademark Office*